United States Patent [19]
Rohr

[11] Patent Number: 4,712,669
[45] Date of Patent: Dec. 15, 1987

[54] VIBRATORY MATERIAL FEEDER WITH VIBRATING GATE

[75] Inventor: Marcel Rohr, Unterfeldweg, Switzerland

[73] Assignee: K-Tron International, Inc., Pitman, N.J.

[21] Appl. No.: 947,856

[22] Filed: Dec. 30, 1986

[51] Int. Cl.⁴ .................................... B65G 27/00
[52] U.S. Cl. .................................... 198/771
[58] Field of Search ............... 198/771, 535, 525–526, 198/636, 633, 382; 222/198, 200

[56] References Cited

U.S. PATENT DOCUMENTS

| | | | |
|---|---|---|---|
| 2,098,034 | 11/1937 | Flint et al. | 198/530 |
| 2,338,954 | 1/1944 | Messerli | 198/755 |
| 2,588,030 | 3/1952 | Musschoot et al. | 198/535 X |
| 2,675,120 | 4/1954 | Autenrieth et al. | 198/535 X |
| 2,997,158 | 8/1961 | Moskowitz et al. | 198/769 |
| 3,524,533 | 8/1970 | Miller et al. | 198/761 |
| 4,279,338 | 7/1981 | Sekora | 198/525 |
| 4,465,592 | 8/1984 | Nagl | 198/771 X |

FOREIGN PATENT DOCUMENTS

| | | | |
|---|---|---|---|
| 2745432 | 4/1979 | Fed. Rep. of Germany | 198/771 |
| 0003835 | 1/1980 | Japan | 198/771 |

*Primary Examiner*—Robert J. Spar
*Assistant Examiner*—D. Glenn Dayoan
*Attorney, Agent, or Firm*—Parkhurst & Oliff

[57] ABSTRACT

A vibratory material feeder including a vibrating gate, particularly suited for feeding fibrous materials. The invention includes a vibrating material feed tray having a section providing a tapered smooth transition from vertical to horizontal for material being fed, and a section including a vibrating gate. The vibrating gate is connected to a vibrating gate support member which is connected, by rotatable supports, to first and second relatively movable portions of the vibratory material feeder. As the material tray vibrates, the vibrating gate support member causes the vibrating gate to move with motion opposite to that of the vibrating tray, and with greater magnitude. The smooth transition from vertical to horizontal, combined with the synchronized motion of the vibrating gate, promotes uniform material flow and prevents material agglomeration, particularly for fibrous materials.

7 Claims, 7 Drawing Figures

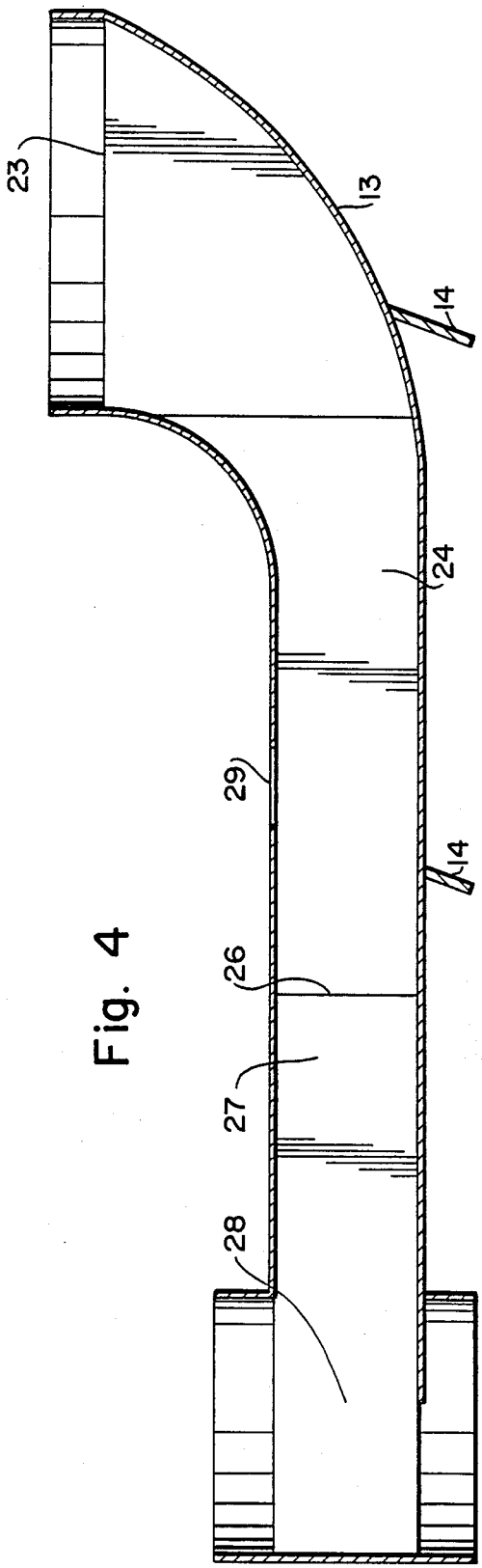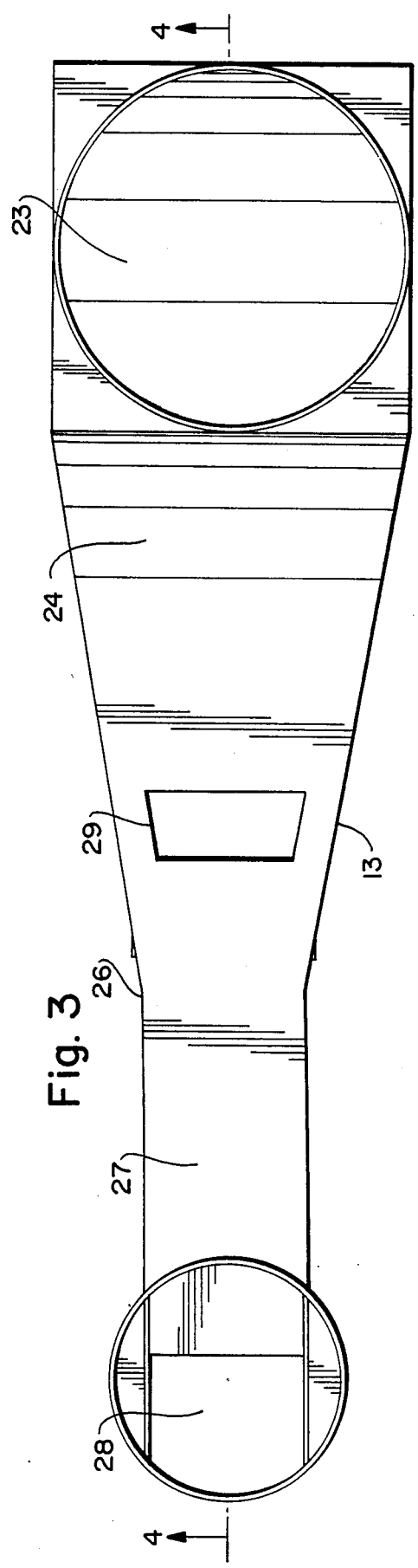

VIBRATORY MATERIAL FEEDER WITH VIBRATING GATE

TECHNICAL FIELD

The invention relates to vibratory material feeders including vibrating material gates to ensure uniformity of material being fed.

BACKGROUND OF THE INVENTION

Vibrating material feeders or conveyors are often used when uniform material feed is desired. For example, when mixing ingredients, a vibrating material feeder for each ingredient is often used. The material fed by each individual feeder must be highly uniform and controlled in order to ensure the proper ratio of ingredients in the mixture. Vibratory material feeders are also used in the manufacture of composite materials including fiber reinforced plastics, metals, ceramics and the like.

When certain materials are used, for example, those susceptible of agglomeration, it is very difficult to maintain uniform material feed without material clumping. This problem is particularly evident when feeding fibrous material.

One solution to the problem of material agglomeration is found in U.S. Pat. No. 3,524,533 wherein vibrating fingers are attached to walls of the material feed tray so as to extend into the interior of the feed tray. However, this approach requires mechanical tuning of the fingers so as to maintain the desired vibration of the fingers, and is not readily adaptable to feeding fibrous materials.

When feeding fibrous materials, for example, chopped fiber glass or carbon or graphite fiber, it is highly desirable to align the individual fibers along the direction of a material feed in order to promote uniform material feed. Use of vibrating fingers within the tray may actually serve to misalign the individual fibers thereby degrading uniform material feed. Thus, use of vibrating fingers attached to the material feed tray may not provide a solution to the problem of feeding fibrous materials at a uniform rate.

SUMMARY OF THE INVENTION

The present invention provides a vibratory material feeder particularly well suited to feeding fibrous materials.

The invention includes a novel vibrating tray shape in combination with a vibrating gate. The vibrating material tray includes a first section having an entrance port and an exit port, the cross-sectional area of the exit port being smaller than the cross-sectional area of the entrance port. Between the entrance port and exit port of the first section is a smooth, tapered portion which serves to provide a smooth material transition from a vertical direction to a horizontal direction. Adjacent the first section is a second section into which the vibrating gate extends. Adjacent the second section is a third section of the vibrating material tray which includes a material discharge port.

The vibrating material tray is connected to a vibrating portion of the feeder which is moveable relative to a base portion of the feeder. The vibrating portion is moved relative to the base portion by, for example, an electromagnetic actuator or the like. The vibrating gate is connected to a first end of a gate supporting member. The gate supporting member has a second end rotatably connected to the base of the feeder. A point intermediate the first and second ends of the gate supporting member is rotatably connected to the vibrating portion of the feeder. The vibrating gate, gate support member and vibrating tray cooperate such that the vibrating gate moves in directions opposite to those of the vibrating tray, and with greater magnitude.

The unique vibrating tray shape and vibrating gate cooperate to provide a vibratory material feeder particularly suited to feeding fibrous materials. The smooth transition portion of the vibrating tray serves to align the filaments of the fibrous material, and the vibrating gate serves to further align the fibrous materials, and to break up any material clumps. This results in a uniform cascade of material discharging from the discharge portion of the vibrating tray without undesirable material clumps.

BRIEF DESCRIPTION OF THE DRAWINGS

FIGS. 3 and 4 are details of the vibrating tray of FIG. 1.

DETAILED DESCRIPTION

Figure 1:
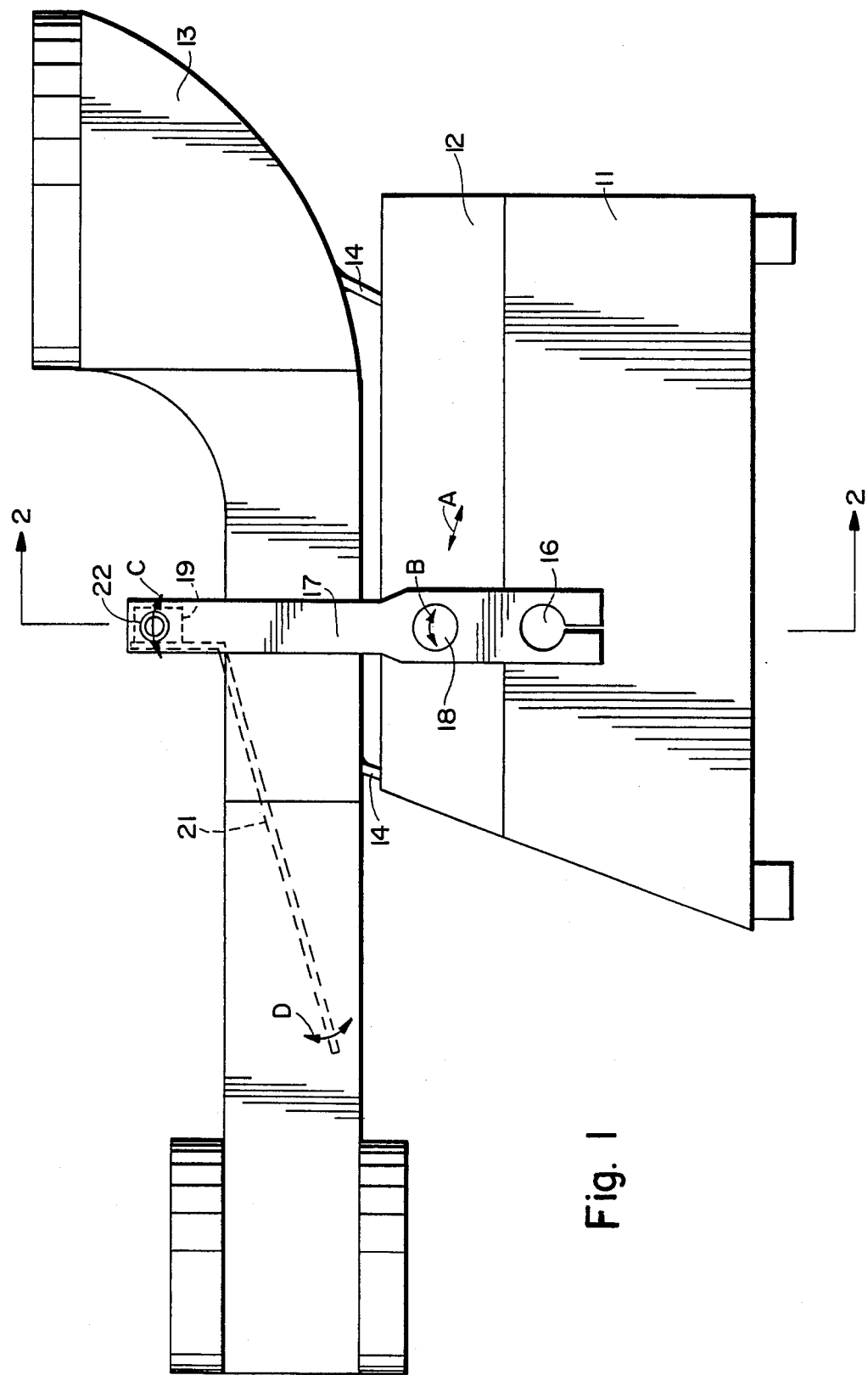
FIG. 1 is a vibratory material feeder according to the present invention.
Figure 2:
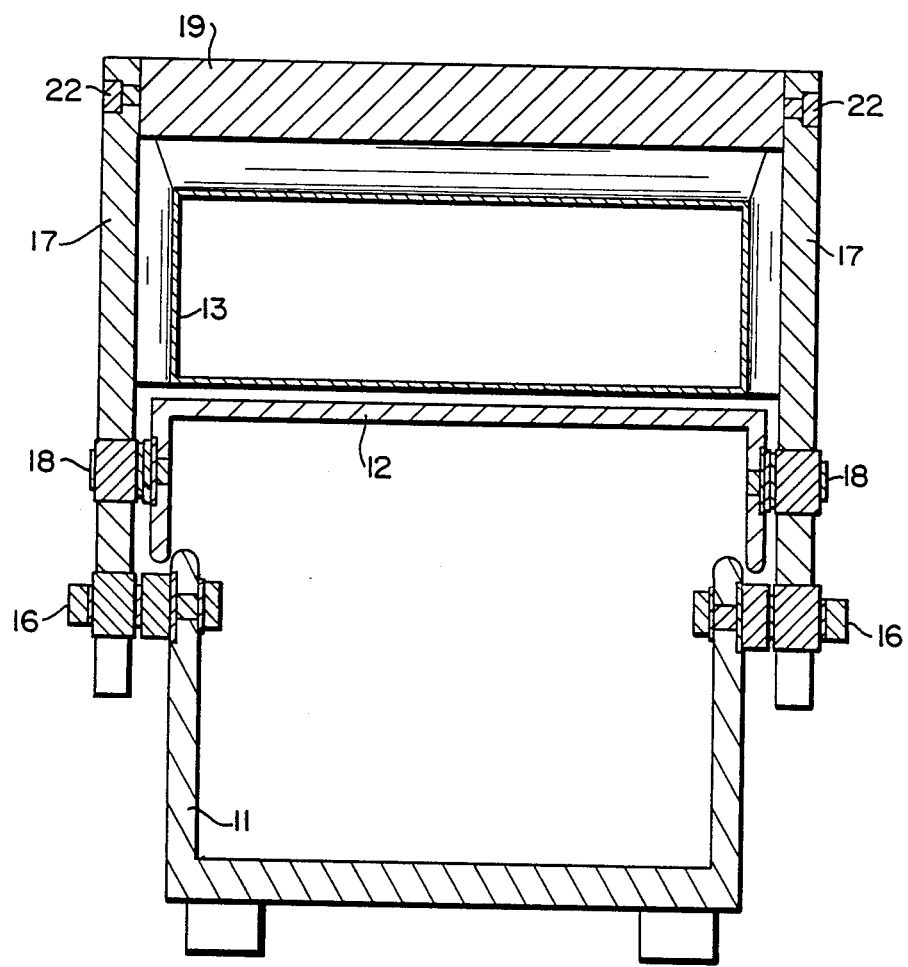
FIG. 2 is a section taken from FIG. 1.

Referring to FIGS. 1 and 2, a vibratory material feeder according to the present invention is shown. The vibratory feeder includes a base portion 11 and a vibrating portion 12. Vibrating portion 12 is typically suspended from base portion 11 by springs or resilient leaves or discs (not shown) or the like. Connected between the base portion 11 and vibrating portion 12 is a vibrating actuator (not shown), for example, an electromagnetic actuator. Configurations of base portion 11, vibrating portion 12 and an electromagnetic actuator are well known and are shown, for example, in U.S. Pat. Nos. 2,098,034, and 2,997,158 the disclosures of which are expressly incorporated herein by reference.

Vibrating portion 12 is attached to vibrating material tray 13 by means of bolts (not shown) through flanges 14, or other equivalent mechanical fixing means.

Rotatably attached to base 11 by means of a rotatable bushing 16, or the like, are vibrating gate support members 17. A point along the lengths of vibrating gate support members 17 is connected to the vibrating portion 12 by means of rotatable bushings 18, or the like. To the free ends of vibrating gate support members 17 is affixed a cross bar 19, to which is fixed vibrating gate 21. Cross bar 19 is fixed to vibrating gate support members 17 by means of bolts 22, or the like.

In operation, for each member 17, the distance between bushings 16 and 18 measured along member 17 is less than the distance between bushing 18 and bolt 22. As portion 12 vibrates, it moves substantially along line A. Thus, as bushing 18 moves with vibrating portion 12, bolt 22 also moves. If bushing 16 is taken as a fixed reference point, bushing 18 moves in a first arc B, and bolt 22 moves in a second larger arc C. Thus, vibrating gate 21, which is fixed relative to bolt 22 moves in a third arc D. Arc D is also larger than arc B. In FIG. 1, the magnitudes of line A and arcs B, C and D have been exaggerated for clarity. Since vibrating tray 13 is fixed to vibrating portion 12 which, in turn, is substantially fixed relative to rotatable bushing 18, as vibrating tray 13 moves in a first direction, vibrating gate 21 moves in a direction substantially opposite to the first direction, and with greater magnitude.

In summary, the combination of the vibrating gate supporting members 17 and the vibrating gate 21 with the vibrating tray 13 produces a vibrating gate 21 which moves with vibrational motion synchronized with but opposite to that of vibrating tray 13 and with greater magnitude. This combination aids in prevention of agglomeration of material being fed, and promotes alignment of fibers when the material being fed is fibrous material.

Referring now to FIGS. 3 and 4, the details of the vibrating tray 13 used in the present invention are disclosed. FIG. 3 is a top view, and FIG. 4 is a cross-sectional side view. For the purposes of explanation, tray 13 comprises first, second and third sections. The first section includes a substantially circular entrance port 23, a curved and tapered section 24 which provides a smooth transition from vertical to horizontal, and a rectangle-shaped exit port 26. The cross-sectional area of exit port 26 is less than the cross-sectional area of entrance port 23. Other shapes for entrance port 23 may also be used, for example, an elipse.

A second section of vibrating tray 13, which is immediately adjacent to the exit port 26 of the first section, is section 27 which, when assembled as shown in FIGS. 1 and 2, will be adjacent vibrating gate 21. It should be noted that, when assembled, vibrating gate 21 extends through port 29 in the top of the first section near exit port 26.

Finally, a third section of vibrating tray 13 comprises discharge port 28.

The substantially circular cross-section of entrance port 23 combined with the smooth transition to small cross-sectional exit port 26 has been determined by the present inventor to be an optimum shape for aligning the fibers of fibrous materials being fed. Thus, the fibers of the material being fed are aligned by the shape of the vibrating feed tray, and are further aligned by the vibrating gate which moves in the above-described motion opposite to that of the vibrating tray, with greater magnitude.

Figure 5:
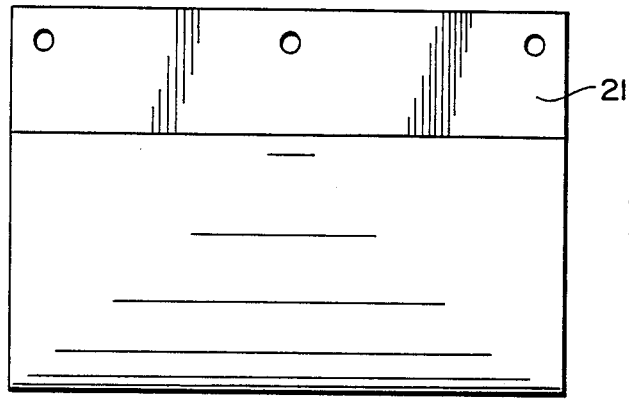
FIGS. 5-7 are details of several vibrating gates which may be used in the present invention.
Figure 6:
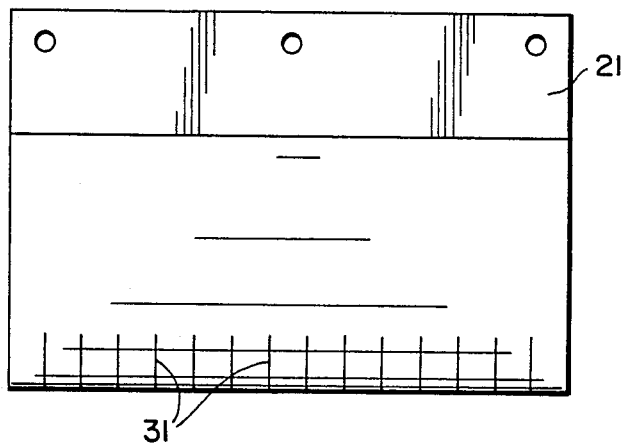
Figure 7:
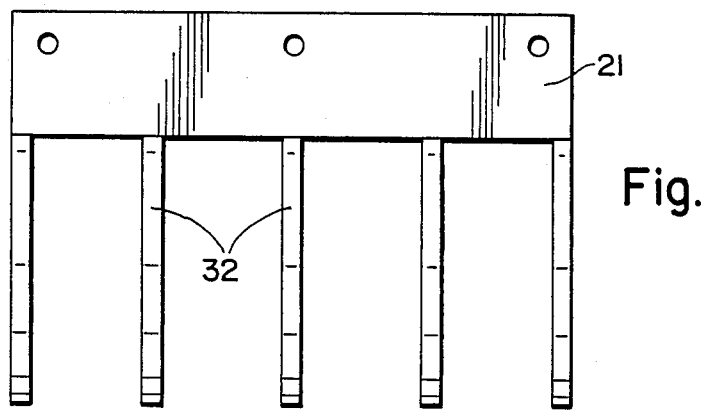

Referring now to FIGS. 5-7, disclosed are several preferred shapes for vibrating gate 21. FIG. 5 is a gate which has a substantially solid planar shape. FIG. 6 discloses a gate similar to that of FIG. 5 but including slits 31 adjacent the edge of gate 21 which will be adjacent the bottom of vibrating tray 13 during operation. Finally, FIG. 7 shows gate 21 comprising spaced apart fingers 32. While the gates of FIGS. 5 and 6 have proven effective for many materials, for example powdered materials, the gate of FIG. 7 has proven most effective for use with fibrous materials.

While the invention has been described with reference to a single preferred embodiment, with suggested equivalents, those skilled in the art will understand that modifications of the disclosed preferred embodiment and suggested equivalents can be made without departing from the spirit and scope of the invention.

I claim:

1. A vibratory material feeder comprising:
   a base portion and a vibrating portion, including a material feed tray, moveable relative to said base portion;
   vibrating gate support means having first and second ends, said first end being rotatably connected to said base portion, and said vibrating portion being rotatably connected to said support means at a point intermediate said first and second ends; and
   vibrating gate means fixed to said second end of said support means and extending into said material feed tray.

2. A vibratory material feeder as recited in claim 1, wherein said point intermediate said first and second ends is closer to said first end than to said seocnd end.

3. A vibratory material feeder as recited in claim 1, wherein said vibrating gate means comprises a substantially solid planar member.

4. A vibratory material feeder as recited in claim 1, wherein said vibrating gate means comprises a substantially planar member with slices perpendicular to an edge of said planar member adjacent said material feed tray.

5. A vibratory material feeder as recited in claim 1, wherein said gate means comprises a plurality of spaced apart fingers.

6. A vibratory material feeder as recited in claim 1, wherein said material feed tray comprises:
   a first section having an entrance port of a first cross-sectional area for accepting material in a substantially vertical direction and for discharging material in a substantially horizontal direction for an exit port of said first section, said exit port having a cross-sectional area smaller than said entrance port;
   a second section, connected to said exit port of said first section, into which said vibrating gate means extends; and
   a third section, connected to said second section, having a tray discharge port.

7. A vibratory material feeder as recited in claim 6 wherein said first section comprises curved and tapered wall sections of said material feed tray providing a smooth transition from vertical to horizontal for material being fed.

* * * * *